(12) United States Patent
Glazko et al.

(10) Patent No.: US 7,130,329 B2
(45) Date of Patent: Oct. 31, 2006

(54) APPARATUS AND METHOD FOR RADIO FREQUENCY TRACKING AND ACQUISITION

(75) Inventors: Serguei A. Glazko, San Diego, CA (US); Keui-Chiang Lai, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/191,728

(22) Filed: Jul. 8, 2002

(65) Prior Publication Data

US 2004/0004962 A1  Jan. 8, 2004

(51) Int. Cl.
   *H04B 1/707* (2006.01)
(52) U.S. Cl. ....................... 375/147
(58) Field of Classification Search ........ 375/224, 375/226, 316, 324, 325, 326, 327, 340, 345, 375/142, 143, 147, 150, 152, 343; 329/371; 370/208, 209
   See application file for complete search history.

(56) References Cited

U.S. PATENT DOCUMENTS

| | | | |
|---|---|---|---|
| 5,168,505 A * | 12/1992 | Akazawa et al. | 375/130 |
| 5,583,837 A * | 12/1996 | Ogino et al. | 369/44.36 |
| 5,610,554 A * | 3/1997 | Anvari | 330/52 |
| 6,366,607 B1 * | 4/2002 | Ozluturk et al. | 375/152 |
| 6,430,214 B1 * | 8/2002 | Jalloul et al. | 375/147 |
| 6,463,043 B1 * | 10/2002 | Shen et al. | 370/320 |
| 6,693,882 B1 * | 2/2004 | Gu et al. | 370/252 |
| 2004/0105382 A1 * | 6/2004 | Miyoshi et al. | 370/204 |

FOREIGN PATENT DOCUMENTS

| | | |
|---|---|---|
| EP | 1058400 A2 | 12/2000 |
| WO | 9931817 | 6/1999 |

* cited by examiner

*Primary Examiner*—Young T. Tse
(74) *Attorney, Agent, or Firm*—Philip Wadsworth; Charles D. Brown; Howard H. Seo

(57) ABSTRACT

A system and method for adjusting loop bandwidth in a synchronization loop of a radio receiver uses a noncoherent peak detector to determine the maximum magnitude and timing of incoming data at various code phase offsets. The maximum magnitude and timing are used in subsequent processing with the maximum magnitude value used to determine an adjustment factor. The timing information associated with the maximum signal value is used to despread the incoming signal. The despread incoming signal is subsequently scaled in accordance with the determined adjustment factor such that the input to the synchronization loop is scaled to produce the desired loop bandwidth.

29 Claims, 4 Drawing Sheets

APPARATUS AND METHOD FOR RADIO FREQUENCY TRACKING AND ACQUISITION

BACKGROUND

1. Technical Field

The present invention is related generally to radio frequency (RF) reception and, more specifically, to an apparatus and method for RF acquisition and tracking.

2. Description of Related Art

Radio frequency (RF) receivers must be designed to acquire and track an incoming RF signal. In an ideal environment, the RF signal travels from a transmitter in a direct line to the receiver. However, in a more realistic setting, the RF signal from the transmitter is reflected or diffracted by various objects and arrives at the RF receiver along multiple pathways. In such a multipath environment, the signal power level fluctuates. In RF receivers synchronization loops, such as phase-locked loops, have a loop bandwidth designed for operation at a desired operating point. However, in a multipath environment, the loop bandwidth of the synchronization loop varies as the signal power level fluctuates. In certain channel conditions, the variation can deviate significantly from the designed operating point, resulting in a performance loss, such as increased acquisition time, smaller pull-in/lock-in ranges, and the like. Conventional solutions to this problem are increased loop bandwidth design or the use of a hard limiter or coherent automatic gain control (AGC) preceding the synchronization loop. However, each of these approaches has design limitations that, under realistic operating conditions, result in degraded performance of the RF receiver.

Therefore, it can be appreciated that there is a significant need for an apparatus and method that can optimize acquisition time and pull-in/lock-in ranges even in a multipath environment. The present invention provides this and other advantages as will be apparent from the following detailed description and accompanying figures.

SUMMARY

The present invention is embodied in a system and method for the detection of a radio frequency signal. In one embodiment, the invention comprises an apparatus for the detection of a radio frequency (RF) signal and comprises a peak detector to detect a peak RF signal and to generate timing data and magnitude data related thereto. A despreader coupled to the peak detector receives the timing data therefrom and despreads the RF signal to generate a despread signal. A gain adjustment generator coupled to the peak detector receives magnitude data therefrom and generates a gain adjustment factor based on the magnitude data. A scaler scales the despread signal by the gain adjustment factor to generate an output signal.

In one embodiment, the peak detector is a noncoherent peak detector. The peak detector may comprise a noncoherent despreader, magnitude estimator and sorter to generate the timing and magnitude data.

In one embodiment, the gain adjustment generator calculates the gain adjustment factor based on the magnitude data.

Alternatively, the gain adjustment generator comprises a data storage area containing a plurality of gain adjustment factors and a selected one of the plurality of gain adjustment factors is selected as the gain adjustment factor based on the magnitude data. The data storage area may comprise a lookup table having an input based on the magnitude data and an output being the selected one of the plurality of gain adjustment factors.

In one embodiment, the scaler is implemented as a multiplier having first and second inputs. The first input is coupled to the despreader and the second input is coupled to the gain adjustment generator.

In one embodiment, the apparatus further comprises a phase-locked loop (PLL) comprising a phase detector, a filter, and a voltage-controlled oscillator (VCO) or numerically controlled oscillator (NCO) wherein the output signal is coupled to the phase detector. In one implementation of the PLL, the phase detector has first and second inputs and an output with the first input being configured to receive the output signal and the second input being coupled to an output of the VCO/NCO. The output of the phase detector is coupled to a control input of the VCO/NCO via the filter.

DETAILED DESCRIPTION OF THE EMBODIMENTS

Synchronization is an essential but challenging task performed in communication receivers. For a receiver to reliability demodulate the transmitted symbols, accurate knowledge of the symbol timing (i.e., when a symbol starts and ends) and carrier frequency is necessary. In addition, coherent receivers must be able to generate a reference signal whose phase is synchronous with that of the received radio frequency (RF) signal.

Figure 1:
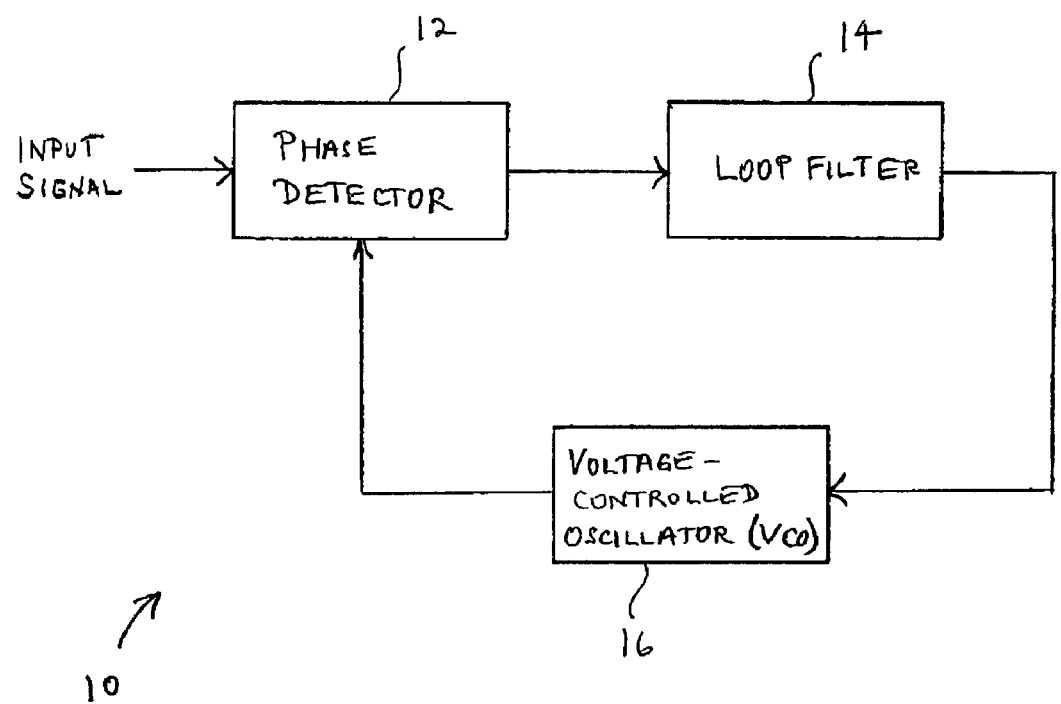
FIG. 1 is a functional block diagram of a conventional phase-locked loop.

The most common synchronization technique is a phase-locked loop (PLL), which is used for both carrier phase and carrier frequency recovery. A time-tracking loop (TTL) is used for timing recovery. FIG. 1 illustrates a conventional PLL 10. As illustrated in FIG. 1, the PLL 10 is basically a feedback control system comprising three basic components: a phase detector 12, a loop filter 14, and a voltage-controlled oscillator (VCO) 16. Those skilled in the art will appreciate that the term VCO is typically used in analog circuits literature while the term numerically controlled oscillator (NCO) is issued in digital circuits literature. As used herein, the terms VCO and NCO can be used interchangeably. The scope of the present invention is not limited by the terms VCO and NCO.

The phase detector 12 generates a signal indicative of the phase difference between an input signal (i.e., the RF signal) and the output of the VCO 16. The signal from the phase detector 12 is processed by the loop filter 14, which is typically a low-pass filter that removes high frequency components at the output of the phase detector 12. Completing the loop, the output of the loop filter 14 is coupled to a control input of the VCO 16. The output of the VCO 16 is a phase estimate of the received signal based on the phase difference measured in the PLL 10.

A loop structure, similar to the PLL 10 illustrated in FIG. 1, is also widely used in frequency and symbol timing synchronization, such as automatic frequency control (AFC) and the TTL (which is an early-late gate synchronizer), respectively. For example, in the AFC loop, the phase detector 12 is replaced with a frequency detector (not shown) that measures the frequency difference between the received signal and the output of the VCO 16. In the TTL, the phase detector 12 is replaced with a discriminator (not shown) that produces a measure of timing error signal. The VCO 16 is replaced with a voltage-controlled clock (not shown) that indicates symbol timing. Thus, the basic loop illustrated by the PLL 10 in FIG. 1 can be modified in a known manner to provide the desired signal processing capability.

The synchronization loop (e.g., the PLL 10, the AFC loop, and the TTL) typically has two modes of operation, namely an acquisition mode, which achieves synchronization, and a tracking mode which maintains synchronization in the presence of unpredictable changes, such as those introduced by the propagation channel or oscillator drifts. Typically, designers are concerned with how fast the system acquires synchronization and how reliably it maintains synchronization. As will be discussed below, these two goals (i.e., acquisition and tracking) are not compatible under all circumstances. Signal acquisition requires design considerations such as under what signal conditions the system can acquire. For example, the system design must consider the initial frequency offset between the received signal and the local oscillator that the system can acquire. This is sometimes referred to as the lock-in range of the receiver. In addition, the receiver must be designed to track changes, such as variations in signal strength, while tracking the phase, frequency and timing of the received signal.

An important parameter in loop design (e.g., a PLL, AFC, or TTL) is the loop bandwidth, which is defined as the equivalent noise bandwidth of the corresponding closed-loop transfer function. For example, the loop bandwidth in the PLL 10 is the equivalent noise bandwidth corresponding to the transfer function between the phase of the received signal and the phase of the output of the VCO 16. The loop bandwidth depends on characteristics of the three components illustrated in FIG. 1. The configuration of the loop filter 14, such as the order of the filter and loop filter coefficients, affect the bandwidth. In addition, signal gains of the phase detector 12 and the VCO 16 and the input signal level also affect the loop bandwidth.

It is well known that, for a given external noise and interference level, a larger loop bandwidth allows more noise and interference to enter the loop, resulting in phase jitter (i.e., the phase estimate at the output of the VCO 16 is noisier) and a lower loop signal-to-noise ratio (SNR). For purposes of the present discussion, noise is a background signal that may be present in the frequency band of interest and may be manmade or naturally occurring. Interference, as used herein, refers to manmade signals, such as undesirable signals from microwaves, other base stations, and other wireless communications systems. If the PLL 10 has a low SNR, the loop is more likely to slip cycles (i.e., incur phase error jumps by multiples of $2\pi$ radians in a short time interval), which is detrimental to applications such as timing recovery. Under some conditions, it is possible to drop out of lock.

On the other hand, a wider loop bandwidth allows shorter acquisition time (i.e., the time needed to reach the synchronous state) and shorter loop response time to changes of the phase (or frequency or timing) of the received signal. Furthermore, a loop with a larger loop bandwidth has a larger pull-in/lock-in range, which is defined as the maximum frequency offset between the received signal and the free running frequency of the VCO 16 for which the loop can acquire with/without cycle slips. In practice, the designed operating point, such as the loop bandwidth, is determined by balancing these tradeoffs.

In a wireless mobile communication system, the transmitted signal travels through multiple propagation paths before arriving a the receiver. Since each propagation path causes random attenuation and phase offset, the received signal, which is a superposition of these multipath components, will experience variation in the phase and amplitude, as well as the arrival time due to the mobility of the receiver. This fading multipath effect may cause severe performance degradation if the receiver design does not mitigate these factors.

In a system employing direct-sequence spread-spectrum signaling, a RAKE receiver is commonly used to combat the fading multipath effects. The RAKE receiver collects signal energies from multiple propagation paths and combines them to increase SNR. RAKE receivers are well known in the art an need not be described in greater detail herein.

The effectiveness of the RAKE receiver is heavily dependent on the accuracy of the channel estimate. In systems where an unmodulated pilot signal is not available, such as systems specified in the IEEE 802.11b standard, the channel estimate is typically obtained in a decision-directed manner. For example, correlating the received signal with a local replica of the spreading code at a given code offset gives an estimate of the product of the transmitted data symbol and the complex-valued channel gain of the multipath component at that offset (i.e., at the corresponding propagation delay). Therefore, assuming the decisions of the transmitted data symbols are sufficiently reliable, the estimate of the channel gain can be obtained by multiplying the correlation by the complex conjugate of the corresponding symbol decisions to remove the data modulation. Thus, this process is decision-directed. To obtain the most accurate symbol decisions, it is clear that, before the channel estimate is obtained and optimal combining can take place, the strongest multipath component should be used in the decision making process since it has the highest SNR among all multipath components.

It should be noted that timing, frequency, and/or phase synchronization (using the various synchronization loops described above) are required to accurately demodulate the transmitted symbols. For the same reason discussed above with respect to the accuracy of the symbol decision, the strongest multipath component should also be used to drive the synchronization loops before multipath components can be optimally combined.

A design problem arises when the synchronization loops operate in a multipath channel. As discussed above, for a given set of loop component parameters and configuration, the loop bandwidth depends on the signal power level entering the loop (i.e., the input signal in FIG. 1). Since the strengths of multipath components vary over time in a random manner, the loop bandwidth, and hence the acquisition time and pull-in/lock-in ranges, fluctuate accordingly. This results in an amplitude modulation phenomenon of the loop bandwidth. That is, the loop bandwidth fluctuates with the amplitude of the input signal. When this fluctuation deviates significantly from the designed operation point, the system will experience a considerable performance loss.

For example, a typical communication receiver utilizes a noncoherent automatic gain control (AGC) mechanism to keep the total input power of the receiver (i.e., the sum of the signal, interference, and noise power) at a constant level. However, in the channel estimation process described above, only the strongest multipath component can be used to drive the synchronization loops. Therefore, even though the noncoherent AGC maintains a constant total received power, the distribution of the power of the constituent multipath components can vary over time. Thus, the strength of the strongest multipath signal can vary over time. This results in a variant input signal power into the loop and thus a variant loop bandwidth.

In a typical implementation, the loop parameters are designed based on the power levels set by the noncoherent AGC. In such a receiver design, the resulting effective loop bandwidth, which is dependent on the power level of the strongest path, is smaller than the target loop bandwidth, which is computed based on the total received power. Consequently, the receiver may have smaller pull-in and lock-in ranges and therefore can tolerate a smaller amount of frequency offset to acquire the input signal.

An additional consequence of the reduced loop bandwidth is a longer acquisition time, assuming it can acquire at all, and therefore the reception of short data packets may fail. A mechanism must be provided that can compensate for the loss of loop bandwidth in a multipath environment to achieve better performance and synchronization, symbol decisions, channel estimation, and RAKE combining.

Conventional attempts to alleviate this problem employ a wider loop bandwidth or precede the synchronization loop with a hard limiter or a coherent AGC. Taking into account the attenuation due to the multipath effect, the bandwidth widening approach increases the target loop bandwidth based on the minimal acceptable or average signal strength of the strongest multipath component and uses this loop bandwidth for all possible incoming signal power levels. Since this approach is based on the worst case or average case scenario, the primary drawback is that the effective loop bandwidth could be excessive in certain channel conditions thereby allowing more noise to enter the loop and thus degrading the performance of the synchronization loop.

A hard limiter is essentially a two-level mid-riser scalar quantizer. This limiter outputs a positive constant value if the input is positive (or a negative constant value if the input is negative). This constant value is determined based on the target loop bandwidth. The hard limiter has a constant output power irrespective of the input power levels of the signal, noise, and interference. Thus, it is clear that the presence of noise and interference suppresses the signal power level at the output of the limiter, thereby degrading the input SNR of the loop. This degradation exacerbates in low SNR conditions.

Figure 2:
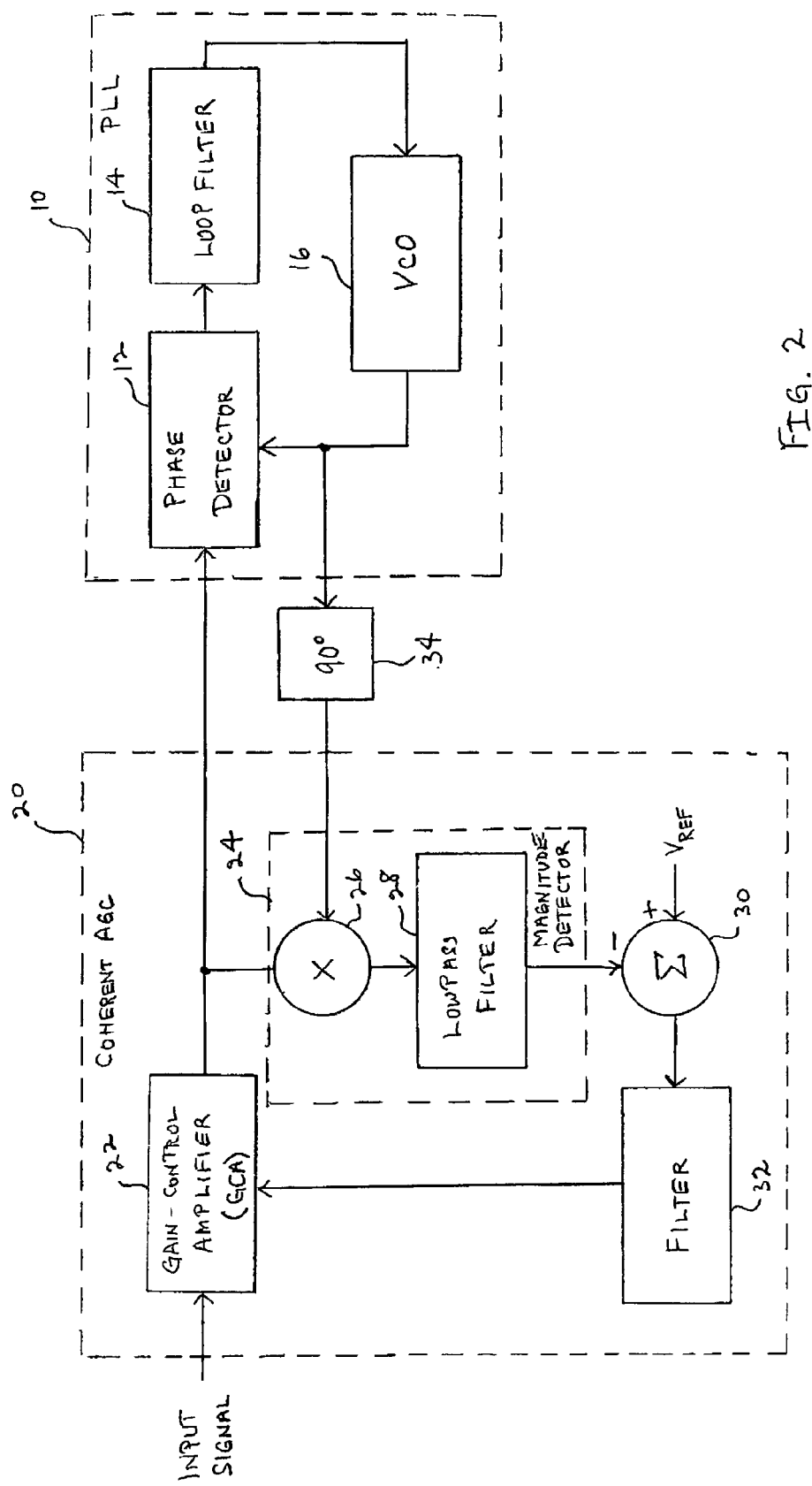
FIG. 2 is a functional block diagram of a conventional receiver using a coherent automatic gain controller preceding a phase-locked loop.

A conventional bandwidth adjustment scheme using a coherent AGC 20 preceding the PLL 10 is illustrated in the functional block diagram of FIG. 2. The coherent AGC 20 has a feedback control structure similar to that of the PLL 10 of FIG. 1. The three elements in the control loop are a gain control amplifier (GCA) 22, a magnitude detector 24 and a filter 32. The magnitude detector 24 is similar to the phase detector 12 in FIG. 1 in that it compares two signals and generates a control voltage. While the phase detector 12 compares the input signal with the output of the VCO 16, the magnitude detector 24 compares a reference voltage $V_{REF}$ with the output of the GCA 22 and generates a difference signal. The difference signal is filtered by the filter 32 to generate a control signal for the GCA 22. The GCA 22 is used to adjust the power of the input signal based on the control signal. The control signal to the GCA 22 is provided by the magnitude detector 24 through the filter 32.

The output of the VCO 16 is coupled to a quadrature phase shifter 34 to provide a phase reference signal for the magnitude detector 24, resulting in a coherent AGC. The magnitude detector 24 comprises a multiplier 26 and a low-pass filter 28. The multiplier 26 combines the output of the GCA 22 and the phase reference signal from the quadrature phase shifter 34 to generate a measure of the signal magnitude. The low-pass filter 28 removes high frequency components of the product to provide a magnitude estimate. The output of the magnitude detector 24 is compared against the reference voltage $V_{REF}$ by an adder 30. The difference signal generated by the adder 30 is filtered by the filter 32, the output of which serves as the control signal to adjust the gain of the GCA 22.

Assuming the response of the coherent AGC 20 is sufficiently fast, it can be shown that the signal magnitude entering the PLL 10 is $$\frac{V_{REF}}{\cos\theta_e}$$

where the $V_{REF}$ is the reference voltage and $\theta_e$ is the phase error between the input of the phase detector 12 and the output of the VCO 16. In a tracking mode (i.e., the PLL 10 is locked), $\theta_e$ is close to zero. Therefore, the input signal magnitude of the PLL 10 is held approximately as a constant at $V_{REF}$, which corresponds to the desired operating point, such as the target loop bandwidth. However, in the acquisition mode (i.e., the PLL 10 is out of lock and attempting to acquire), $\theta_e$ is not close to zero. As a result, the input signal magnitude of the PLL 10 is greater than $V_{REF}$ since the $|\cos \theta_e| < 1$ for $\theta_e \neq k\pi$ where k is an integer, resulting in an excessive loop bandwidth. The drawback of this approach is similar to that of the bandwidth widening approach discussed above. Appropriate adjustment of loop bandwidth, especially in the acquisition mode, is crucial to satisfactory operation of a receiver circuit.

Figure 3:
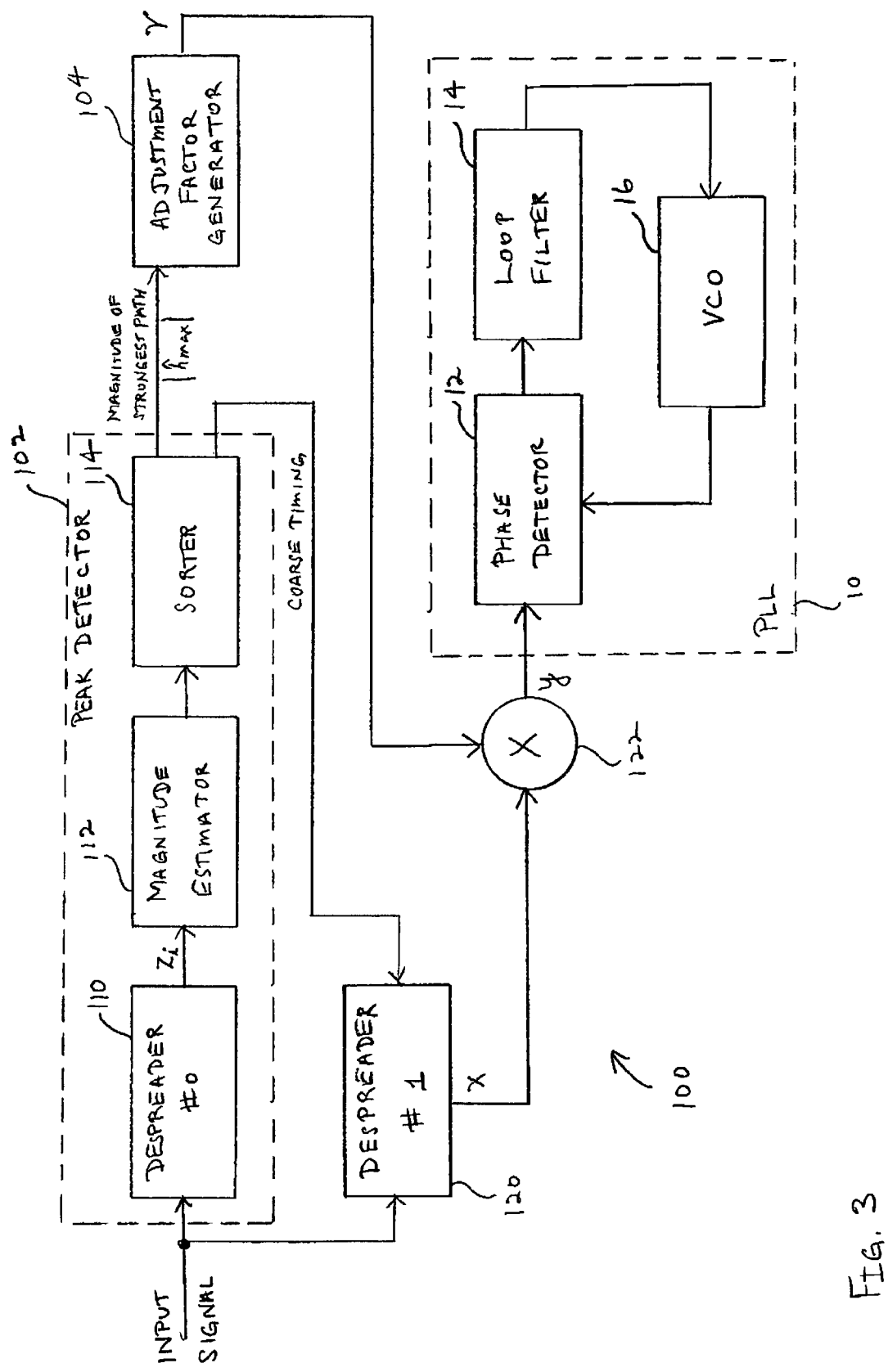
FIG. 3 is a functional block diagram of a portion of a radio frequency receiver illustrated in one implementation of the present invention.

An embodiment of the present invention provides a technique by which the loop bandwidth is adjusted based on signal strength. An embodiment of the present invention is shown in a system 100 illustrated in the functional block diagram of FIG. 3. The system employs a noncoherent peak detector 102 to estimate the strength of the strongest multipath component and then scales the input of the synchronization loop via a bandwidth adjustment gain factor to compensate for the loss of loop bandwidth. Since the peak detector 102 is noncoherent, a phase reference from the synchronized PLL 10 is not needed thereby alleviating the problem faced by the coherent AGC approach in the acquisition mode, as discussed above with respect to FIG. 2. In addition, the bandwidth adjustment factor of the system 100 scales the signal component and the interference/noise component by the same amount. Therefore, unlike the hard limiter which causes SNR degradation, the input SNR of the loop in the system 100 is not changed. As illustrated in FIG. 3, the input signal, which is the received signal, is a superposition of all multipath components, including interference and noise. The input signal is first despread by a despreader 110 at various code offsets. In a typical implementation, the despreader 110 uses code offsets at every one-half chip interval. However, other intervals may be used. The present invention is not limited by the specific chip interval used by the despreader 110.

For purposes of the following discussion, the complex-valued channel gain of the multipath component at the $i^{th}$ code offset is designated as $h_i$ and the gain associated with the strongest multipath component is designated as $h_{max}$. Without a loss of generality, and for the convenience of exposition, it can be assumed that $$\sum_i |h_i|^2 = 1.$$

That is, the average received signal power is the same as the transmitted signal power. It can also be assumed, for the sake of discussion, that the transmitted data symbol d has a unit power (i.e., $|d|=1$). Also, for the reasons discussed above, it can be assumed that the local replica of the spreading sequence at the receiver is normalized such that the output of the despreader 110 has a unit power when a transmitted spread sequence of a symbol interval is received without any distortion. Thus, the output of the despreader 110 at the $i^{th}$ code offset may be written as:

$$z_i = z_{Ii} + j z_{Qi} = h_i d + I_i + N_i \quad (1)$$

where $z_{Ii}$ and $z_{Qi}$ are the in-phase and quadrature components of $z_i$, respectively, and $I_i$ and $N_i$ denote interference and noise of the $i^{th}$ code offset, respectively. The interference may be from external sources and other multipath components.

Since the despreader 110 provides a processing gain that can suppress noise and interference (i.e., $I_i$ and $N_i$ in equation (1) are relatively small compared to the signal component $h_i$ and d), it follows that $z_i$ serves as an estimate of the product of the transmitted data symbol d and channel gain $h_i$.

The outputs $\{z_i\}$ of the despreader 110 are coupled to a magnitude estimator 112, which generates the magnitude estimates of the channel gains of the various multipath components. The magnitude estimator 112 can be implemented with a variety of different techniques. For example, the magnitude estimate of $h_i$, denoted as $|\hat{h}_i|$, may be obtained noncoherently by:

$$|\hat{h}_i| = |z_i| = \sqrt{z_{Ii}^2 + z_{Qi}^2} \approx |h_i||d| = |h_i| \quad (2)$$

where it has been assumed that $|d|=1$. Those skilled in the art will recognize that the magnitude estimator 112 may be implemented using other known techniques. The present invention is not limited by the specific implementation of the magnitude estimator 112.

It should be noted that the magnitude estimates are typically averaged over several symbol intervals to reduce the variance of the estimates. These magnitude estimates are coupled to a sorter 114 that selects the largest magnitude, denoted by $|\hat{h}_{max}|$ where:

$$|\hat{h}_{max}| = \max_i \{|\hat{h}_i|\} \quad (3)$$

where the value of $$|\hat{h}_{max}|$$

represents the magnitude estimate of the strongest multipath component and the corresponding code phase indicates the coarse timing of that multipath component. That is, the $i^{th}$ code offset provides timing information while the magnitude associated with that $i^{th}$ component is given by equation (3) above. Thus, the sorter 114 produces both magnitude and timing information. The magnitude of the strongest path (i.e., $|\hat{h}_{max}|$) indicates the magnitude of the strongest path. The signal is provided to an adjustment factor generator 104, as will be described in greater detail below.

As noted above, the sorter 114 also produces coarse timing information indicative of the timing of the strongest path of the multipath components. The coarse timing information is used in a despreader 120 to despread the strongest multipath component. Similar to the output of the despreader 110 as expressed in equation (1), it clear that the output of the despreader 120 can be expressed as:

$$x = h_{max} d + I' + N' \quad (4)$$

where I' and N' denote the corresponding interference and noise components, respectively. It should be noted that fine timing for the strongest signal path may be derived by a TTL (not shown) and used together with the coarse timing for the despreader 120. For the sake of brevity and clarity, the fine timing component is not illustrated in FIG. 3. However, the use of a TTL for fine timing is well known in the art, and need not be described in greater detail herein.

It should be noted that, in a typical design, the output of the despreader 120 (designated as x), is the input of the synchronization loop. This is the equivalent of the "Input Signal" in FIGS. 1–2. As previously discussed with respect to a noncoherent AGC, the loop bandwidth parameter is typically designed based on the total received power maintained by the noncoherent AGC. That is, the desired input of the loop can be expressed as:

$$x_{desired} = \sum_i |h_i|^2 d + I + N = d + I + N \quad (5)$$

where all parameters have been previously defined. Note that in equation (5), the term $$\sum_i |h_i|^2$$

represents the total received power collected from all the multipath components with the assumption that the noncoherent AGC achieves $$\sum_i |h_i|^2 = 1.$$

Comparing equations (4) and (5), it can be seen that x, the input of the synchronization loop, is attenuated by $h_{max}$ since $$h_{max} < \sum_i |h_i|^2 = 1,$$

resulting in a loss of loop bandwidth.

To compensate for the loss of loop bandwidth, the output of the despreader 120 is scaled by a factor $$\gamma = \frac{1}{|\hat{h}_{max}|}$$

using, by way of example, a multiplier. This factor is computed based on the magnitude of the strongest path (i.e., $|\hat{h}_{max}|$) of the output of the peak detector 102, such that the output of the multiplier 122, designated as y in FIG. 3, becomes:

$$y = \frac{1}{|\hat{h}_{max}|} x = \frac{h_{max}}{|\hat{h}_{max}|} d + \frac{I' + N'}{|\hat{h}_{max}|} \approx d + \frac{I' + N'}{|\hat{h}_{max}|} \quad (6)$$

where the approximation that $|\hat{h}_{max}| \approx |h_{max}|$ follows from equation (2) above. Comparing equation (5) with equation (6), it is clear that, after gain adjustment, the input signal power is approximately the same as the desired one.

For efficient hardware implementation, the generation of the loop bandwidth adjustment factor by the adjustment factor 104 can be obtained by a table look-up to eliminate the division operation required in computing $$\gamma = \frac{1}{|\hat{h}_{max}|}.$$

Specifically, the input of the data look-up table is the peak detector output $|\hat{h}_{max}|$, and the output of the table is pre-computed quantized version of $$\frac{1}{|\hat{h}_{max}|}.$$

It should be noted that multiple ways of performing the quantization may be implemented by the system 100. For example, the quantization may be linear or nonlinear. The actual implementation depends on the specific performance requirement and the complexity constraints, such as the maximum memory size allowed to store the lookup table. It is further noted that the multiplication of the adjustment factor by the multiplier 122 can be done after the phase detector 12 and before the loop filter 14. In this manner, it is possible to save a real multiplier because the output of the despreader 120 is typically complex-valued while the output of the phase detector 12 is real-valued. Finally, it should be noted that although FIG. 3 is illustrated with the use of the PLL 10, the same loop adjustment mechanism can be applied without modification to the AFC and the TTL simply by replacing the PLL in FIG. 3 by the corresponding synchronization loop.

The components illustrated in the functional block diagram of FIG. 3 may be implemented by known hardware components or implemented as a set of instructions executed by a processor, such as a digital signal processor (DSP). Alternatively, the components illustrated in the functional block diagram of FIG. 3 may be implemented by a combination of hardware components and instructions executed by the DSP.

Figure 4:
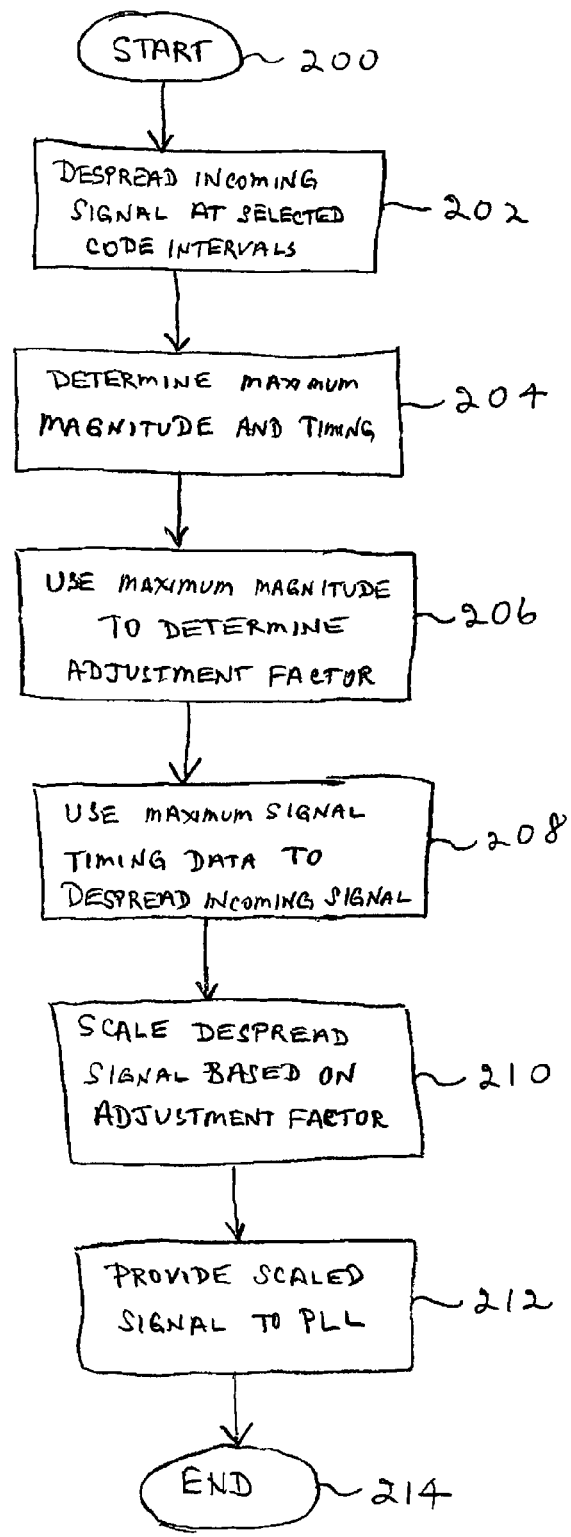
FIG. 4 is a flowchart illustrating the operation of one implementation of the present invention.

The process implemented by the system 100 is illustrated in the flowchart of FIG. 4 where at a start 200 an input signal has been detected by a radio receiver. Those skilled in the art will appreciate that conventional radio components, such as an antenna, radio frequency amplifier, filters, and the like may be used with the system 100. For the sake of clarity and brevity, these conventional components are not illustrated herein. In step 202, the system 100 despreads the incoming signal at selected code intervals. Although a typical code interval of one-half chip may be used, other code intervals may be readily implemented by the system 100. In step 204, the system 100 determines the maximum magnitude and timing. As previously discussed, a series of code samples at the selected chip intervals are analyzed to determine which code interval has the maximum amplitude. The magnitude of that sample and the timing of that sample are used in subsequence processes.

In step 206, the system 100 uses the maximum magnitude to determine an adjustment factor. As previously discussed, the adjustment factor may be calculated in real time based on the teachings provided herein. Alternatively, the calculations may be performed in advance with desired scale factors prestored in a storage area, such as a look-up table. Different implementations of the storage area are known in the art and need not be described herein. The present invention is not limited by the specific implementation of the adjustment factor, whether it is implemented in the form of real time calculations, data look-up table, or whether it is implemented by hardware or software instructions executed by the DSP.

In step 208, the system 100 uses the timing information derived in step 204 to despread the incoming signal. As previously discussed, the selected code sample may provide rough timing information and a TTL may be used to provide fine timing information for the despreading operation performed in step 208. In step 210, the system scales the despread signal based on the adjustment factor calculated in step 206.

In step 212, the system 100 provides the scaled signal to a phase locked loop, such as the PLL 10 in FIG. 3. The process ends at step 214.

Thus, the system 100 scales the input signal to achieve the desired loop bandwidth in the PLL 10. The system 100 has been described above in a number of varying implementations. It is to be understood that even though the various embodiments and advantages have been set forth in the foregoing description, the above disclosure is illustrative only, and changes may be made in detail, yet remain within the broad principles of the invention. Therefore, the present invention is to be limited only by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An apparatus for detection of a radio frequency (RF) signal, comprising:
   a peak detector to detect a peak RF signal and to generate timing data and magnitude data related thereto;
   a despreader coupled to the peak detector to receive the timing data therefrom, the despreader despreading the RF signal to thereby generate a despread signal;
   a gain adjustment generator coupled to the peak detector to receive the magnitude data therefrom, the gain adjustment generator generating a gain adjustment factor based on the magnitude data; and
   a scaler to scale the despread signal by the gain adjustment factor to generate an output signal, wherein the gain adjustment generator comprises a data storage area containing a plurality of gain adjustment factors and a selected one of the plurality of gain adjustment factors is selected as the gain adjustment factor based on the magnitude data.

2. The apparatus of claim 1 wherein the peak detector is a noncoherent peak detector.

3. The apparatus of claim 1 wherein the peak detector comprises a noncoherent despreader, a magnitude estimator, and a sorter to generate the timing and magnitude data.

4. The apparatus of claim 1 wherein the gain adjustment generator calculates the gain adjustment factor based on the magnitude data.

5. The apparatus of claim 1 wherein the plurality of gain adjustment factors are selected to be inversely proportionate to the magnitude data.

6. The apparatus of claim 1 wherein the data storage area comprises a look-up table having an input based on the magnitude data and an output being the selected one of the plurality of gain adjustment factors.

7. The apparatus of claim 1 wherein the scalar is a multiplier having first and second inputs with the first input being coupled to the despreader and the second input being coupled to the gain adjustment generator.

8. The apparatus of claim 1, further comprising a phase-locked loop (PLL) comprising a phase detector, a filter and a voltage-controlled oscillator (VCO) or numerically controlled oscillator (NCO) wherein the output signal is coupled to the phase detector.

9. The apparatus of claim 8 wherein the phase detector has first and second inputs and an output with the first input being configured to receive the output signal and the second input being coupled to an output of the VCO or NCO, and the output of the phase detector being coupled to a control input of the VCO or NCO via the filter.

10. An apparatus for detection of a radio frequency (RF) signal, comprising:
    means for detecting a peak RF signal and for generating magnitude data relating thereto;
    means for generating a gain adjustment factor based on the magnitude data;
    means for despreading the RF signal to thereby generate a despread signal; and
    means for scaling the despread signal by the gain adjustment factor to generate an output signal,
    wherein the means for generating a gain adjustment factor comprises a data storage area containing a plurality of gain adjustment factors and a selected one of the plurality of gain adjustment factors is selected as the gain adjustment factor based on the magnitude data.

11. The apparatus of claim 10 wherein the means for detecting a peak RF signal generates timing data associated with a detected peak, and the means for despreading the RF signal despread the RF signal by using the timing data.

12. The apparatus of claim 10 wherein the means for detecting a peak RF signal is a noncoherent means for detecting the peak RF signal.

13. The apparatus of claim 10 wherein the means for detecting a peak RF signal comprises noncoherent means for despreading the RF signal, means for estimating a magnitude of the despread RF signal, and means for sorting the estimated magnitude of the despread RF signal to generate the magnitude data.

14. The apparatus of claim 10 wherein the means for generating a gain adjustment factor calculates the gain adjustment factor based on the magnitude data.

15. The apparatus of claim 10 wherein the plurality of gain adjustment factors is selected to be inversely proportionate to the magnitude data.

16. The apparatus of claim 10 wherein the data storage area comprises a look-up table having an input on the magnitude data and an output being the selected one of the plurality of gain adjustment factors.

17. The apparatus of claim 10 wherein the means for scaling comprises a multiplier having first and second inputs with the first input being coupled to the means for despreading the RF signal and the second input being coupled to the means for generating the gain adjustment factor.

18. The apparatus of claim 10 further comprising a phase-locked loop (PLL) comprising a phase detector, a filter and a voltage-controled oscillator (VCO) wherein the output signal is coupled to the phase detector.

19. The apparatus of claim 18 wherein the phase detector has first and second inputs and an output with the first input being configured to receive the output signal and the second input being coupled to an output of the VCO, and the output of the phase detector being coupled to a control input of the VCO via the filter.

20. A method for detection of a radio frequency (RF) signal, comprising:
    detecting a peak RF signal and for generating magnitude data relating thereto;
    generating a gain adjustment factor on the magnitude data;
    despreading the RF signal to generate a despread signal; and scaling the despread signal by the gain adjustment factor to generate an output signal,
    wherein generating a gain adjustment factor comprises storing a plurality of gain adjustment factors and selecting a selected one of the plurality of gain adjustment factors as the gain adjustment factor based on the magnitude data.

21. The method of claim 20 wherein detecting a peak RF signal comprises generating timing data associated with the detected peak RF signal.

22. The method of claim 20 wherein detecting the peak RF signal comprises noncoherently detecting the peak RF signal.

23. The method of claim 20 wherein detecting the peak RF signal comprises noncoherently despreading the RF signal, estimating a magnitude of the despread RF signal, and sorting the estimated magnitude of the despread RF signal to generate the magnitude data.

24. The method of claim 20 wherein generating a gain adjustment factor comprises calculating the gain adjustment factor based on the magnitude data.

25. The method of claim 20 wherein the plurality of gain adjustment factors is selected to be inversely proportionate to the magnitude data.

26. The method of claim 20 wherein storing the plurality of gain adjustment factors comprises storing the plurality of gain adjustment factors in a look-up table having an input based on the magnitude data and an output being the selected one of the plurality of gain adjustment factors.

27. The method of claim 20 wherein scaling comprises multiplying the despread signal and the gain adjustment factor.

28. The method of claim 20, further comprising synchronizing with the RF signal using a synchronization loop wherein the output signal is provided to an input of the synchronization loop.

29. The method of claim 28 wherein synchronizing with the RF signal uses a phase-locked loop having an input configured to receive the output signal.

* * * * *